(12) United States Patent
Kaplinsky

(10) Patent No.: US 6,241,090 B1
(45) Date of Patent: Jun. 5, 2001

(54) FISHING CASE

(76) Inventor: Leonid Kaplinsky, 9533 Kedvale, Skokie, IL (US) 60076

(*) Notice: Subject to any disclaimer, the term of this patent is extended or adjusted under 35 U.S.C. 154(b) by 0 days.

(21) Appl. No.: 09/479,692

(22) Filed: Jan. 7, 2000

Related U.S. Application Data

(63) Continuation-in-part of application No. 09/161,912, filed on Sep. 28, 1998, now abandoned.

(51) Int. Cl.[7] .................................................... B65D 85/00
(52) U.S. Cl. ........................ 206/315.11; 206/523; 43/54.1
(58) Field of Search ............................ 206/315.1, 315.11, 206/523, 579, 588, 589, 811, 592; 43/54.1, 55, 57.1, 4; 224/579, 585, 626, 645, 920, 922; 190/109, 110, 113–115

(56) References Cited

U.S. PATENT DOCUMENTS

| | | | |
|---|---|---|---|
| 2,432,365 | * 12/1947 | Allen ...................................... | 190/114 |
| 3,580,467 | * 5/1971 | Pieszak .................................. | 206/523 |
| 4,106,597 | * 8/1978 | Shook et al. .......................... | 190/110 |
| 4,433,781 | * 2/1984 | Hummel ................................. | 206/523 |
| 4,723,657 | * 2/1988 | Robinson .............................. | 190/110 |
| 4,763,791 | * 8/1988 | Halverson et al. ................... | 206/523 |
| 4,887,751 | * 12/1989 | Lehman ................................ | 190/110 |
| 5,174,058 | * 12/1992 | Boyer ..................................... | 43/54.1 |
| 5,547,079 | * 8/1996 | Pino .................................. | 206/315.11 |

* cited by examiner

*Primary Examiner*—Luan R. Bui
(74) *Attorney, Agent, or Firm*—Goldstein & Canino

(57) ABSTRACT

A fishing case for storing a variety of fishing equipment. The fishing case comprises a substantially rectangular body that has a front section and a back section. The front section and the back section are provided with a closing means that helps to securely fastens the front section and the back section together. The inside of the back section is fitted with a cutout insert having a plurality of cutouts that house various fishing equipment pieces. The fishing case may be provided with a handle and straps on its back to facilitate the user in carrying the fishing case.

12 Claims, 4 Drawing Sheets

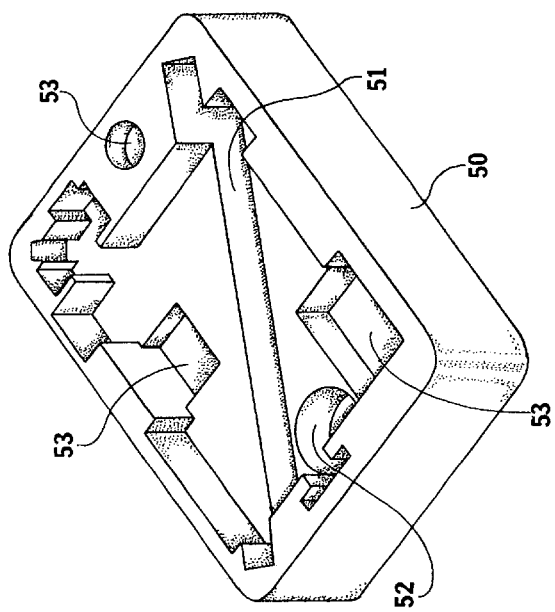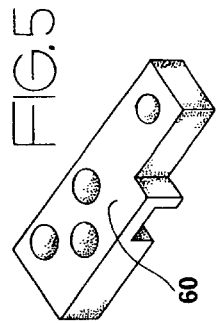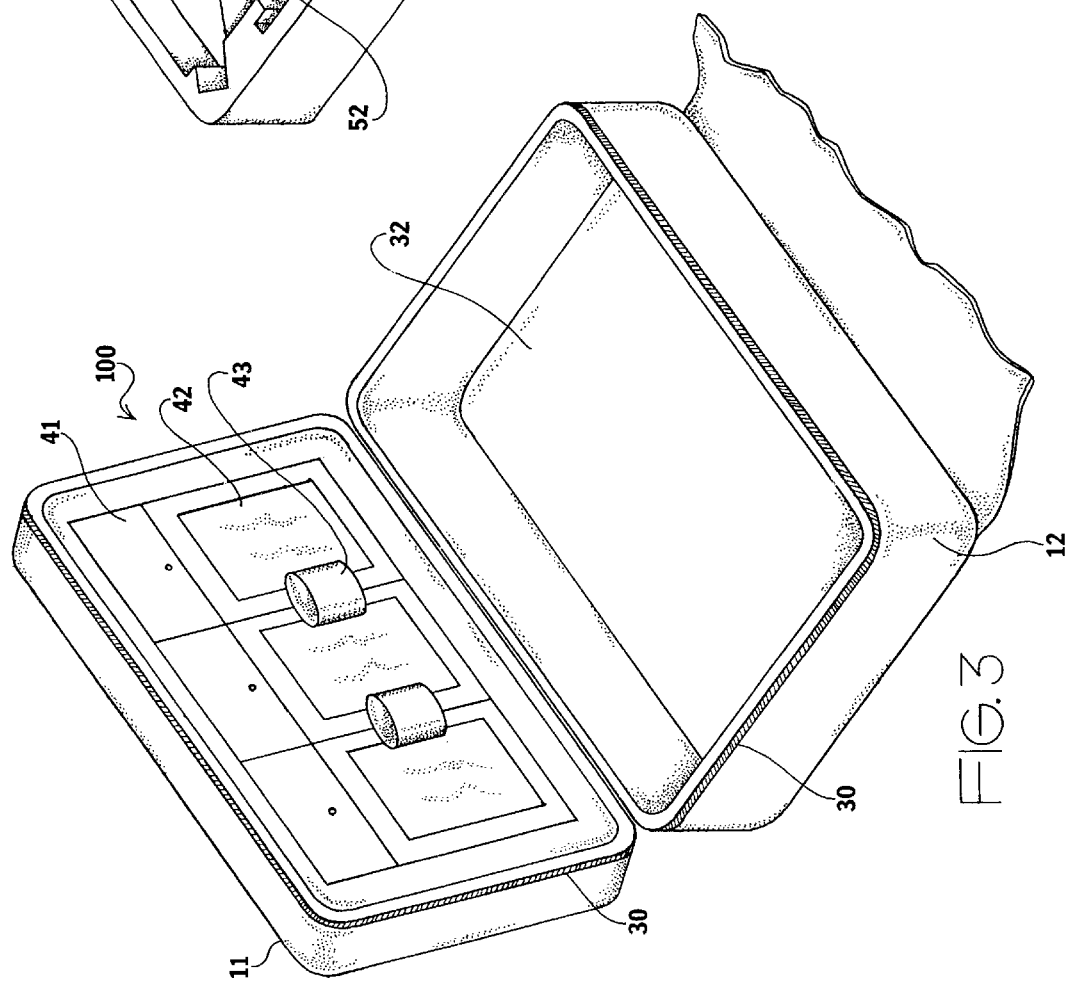

FISHING CASE

CROSS REFERENCES AND RELATED SUBJECT MATTER

This application is a continuation-in-part of patent application Ser. No. 09/161,912, filed in the United States Patent Office on Sep. 28, 1998, abandoned.

BACKGROUND OF THE INVENTION

This invention relates to a fishing case. More particularly, the invention relates to a lightweight, portable and ergonomically-designed fishing case that compactly stores one's fishing equipment.

When travelling on business, one often has the opportunity to go fishing. However, conventional fishing equipment is not easy to carry. In addition, when business brings the fisherman to a new, unknown fishing spot, the fisherman usually does not know what type of fishing will be available at that location and therefore does not know what type of equipment to bring. Because it is difficult to anticipate the type of fishing that will be available, the fisherman must bring additional equipment.

Even while at home, professional and amateur fishermen alike constantly seek that special fishing spot where the fish are plentiful and are always biting. Unfortunately, the best fishing spots are not always easily accessible by car. Thus, fishermen often find that they must carry all their fishing equipment to a remote fishing site.

In addition, transportation and storage of fishing rods and reels generally requires disassembly of the rods from the reels, enclosing the rods in rigid tubes and putting the reels in separate cloth bags or boxes. These tubes, bags, or boxes only accommodate a single rod or reel.

To overcome the inherent problem of carrying a numbers of bags, it has been suggested to construct carrying cases that can enclose the entirety of a fishing rod along with the reel. For example, U.S. Pat. No. 5,341,590 to Hepworth et al. discloses a rigid carrying case for a fly fishing rod along with the fly fishing reel. U.S. Pat. No. 5,319,874 to Vance discloses a soft sided carrying case for fishing poles. However, this carrying case is designed such that it can only contain a fishing rod and/or reel. As a result, fishermen are forced to carry their fishing accessories such as floats, fishing rod flies, bait and sunglasses in additional cases or bags. Alternately, a fisherman may wear a bulky fishing jacket comprising an excessive number of pockets for carrying his fishing accessories. The use of a fishing jacket by the fisherman has the disadvantage that the fisherman's ability to maneuver is severely restrained by the various accessories stored in the pockets of his fishing jacket.

While these units mentioned above may be suitable for the particular purpose employed, or for general use, they would not be as suitable for the purposes of the present invention as disclosed hereafter.

SUMMARY OF THE INVENTION

It is an object of the present invention to provide a fishing case that is capable of storing all standard fishing equipment and accessories. Accordingly, internal compartments are provided for neat storage of all ordinary fishing supplies and equipment.

It is another object of the invention to provide a fishing case that is lightweight and portable.

It is yet another object of the invention to provide a fishing case that protects the fishing equipment from water damage. Accordingly, the case has a water-proof exterior which prevents water from entering the interior of the fishing case.

It is a still further object of the invention to provide a fishing case that may be carried as a brief case or as a backpack. Accordingly, a handle and a pair of straps are provided on the fishing case.

To accomplish the above and related objects, the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

FIG. 3 is a perspective view of the case in the open position, illustrating the interior thereof.

FIG. 4 is a perspective view of a first cutout insert that mounts within the fishing case and houses various fishing equipment inside the fishing case.

FIG. 5 is a perspective view of a second layer cutout insert that may be placed over the cutout insert of FIG. 4.

DETAILED DESCRIPTION OF THE PREFERRED EMBODIMENTS

Figure 1:
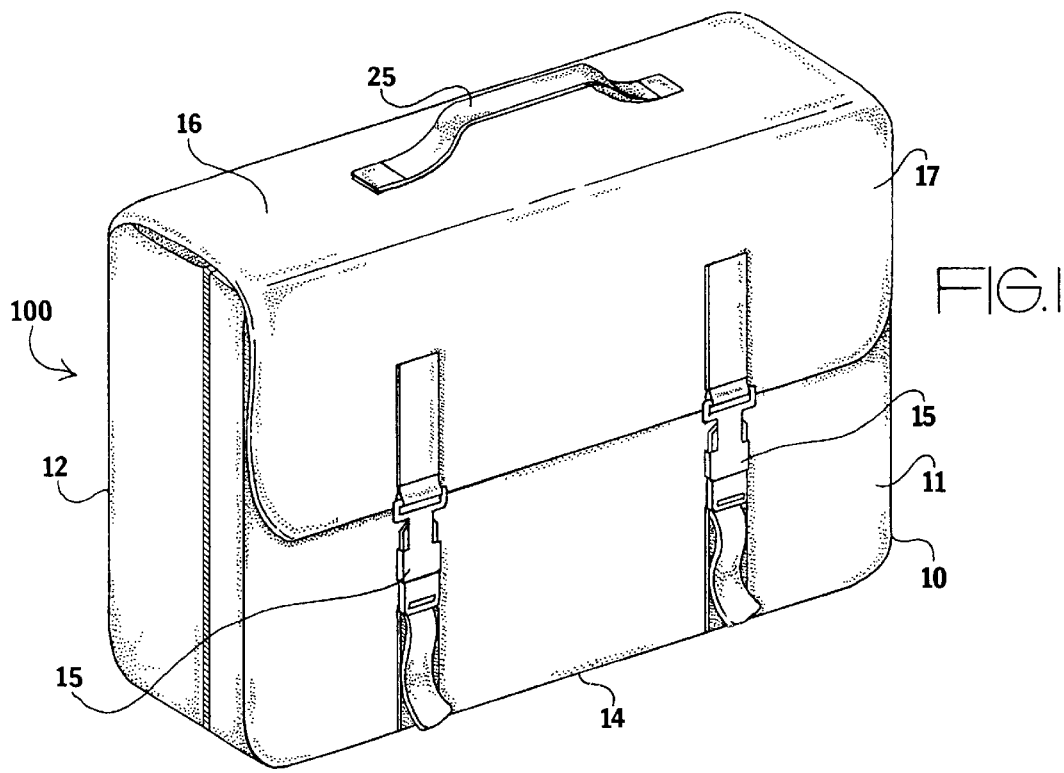
FIG. 1 is a diagrammatic perspective view of the fishing case, closed and ready for transporting.
Figure 2:
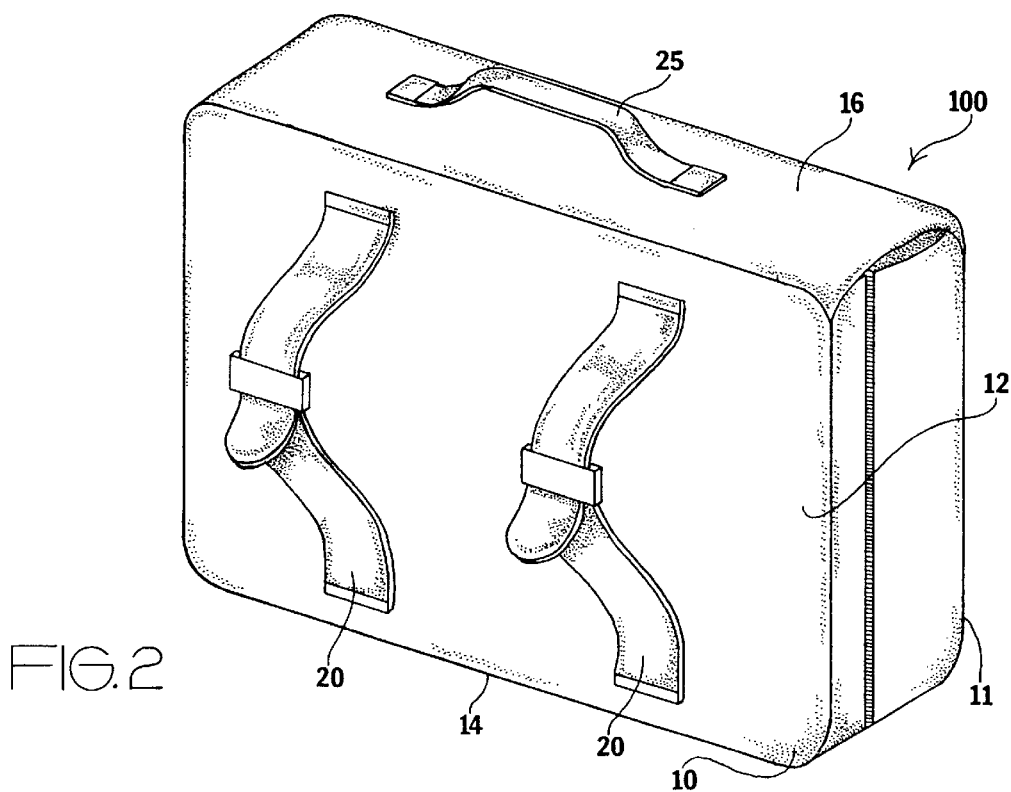
FIG. 2 is a diagrammatic perspective view of the fishing case illustrating a pair of straps.

Initial reference is made to FIGS. 1 and 2. As shown in FIG. 1, fishing case 100 is a rectangular structure. The fishing case 5 has a front section 11 and a back section 12. The front section 11 is hingeably attached to the back section 12. According to the present invention, the fishing case 5 is appropriately sized to contain the user's fishing fly or rod in its folded or dismantled position and all of the user's fishing supplies and accessories. In the preferred form, the fishing case 5 is approximately sixteen inches in length along its top portion 16 and its bottom portion 14, approximately twelve inches in height and approximately four inches deep.

Referring momentarily to FIG. 3, the fishing case 100 has an exterior portion 10 and an interior portion 32 that is provided with space for storage.

It is preferable that the exterior portion 10 of the fishing case 5 be constructed of a water-proof material, such as nylon, canvas, or the like. The use of a water-proof material for the exterior portion 10 ensures that the fishing equipment stored inside the fishing case 5 are not damaged when the user wades into the water while fishing.

The top portion 16 of the fishing case 5 is provided with a U-shaped handle 25 to facilitate in carrying the fishing travel case 5. The handle 25 may be constructed from any sturdy and resilient material.

As shown in FIG. 2, the back portion 12 of the fishing travel case 5 is provided with a pair of straps 20. The presence of the pair of straps 20 has the advantage of allowing the user to carry the fishing case 5 as a backpack.

Once the fishing case 5 has been stocked with the fishing equipment, it may be closed by extending the closing flap 17 onto the front section 11 and securely engaging the reciprocal fastening means 15. It is preferable that the fastening means 15 be a zipper to ensure that the closing flap 17 is firmly affixed onto the front section 11 of the fishing case 5. Alternately, the fastening means 15 may be a hook and loop fastener, snap buttons or the like.

As shown in FIG. 3, the front section 11 and the back section 12 of the fishing case 5 are provided with a closing means 30. The closing means 30 allows the user to securely fasten the front section 11 to the back section 12 to maintain the case in a closed position. According to a preferred embodiment, the closing means 30 is a zipper. To open the case to provide access to the inside portion 32 of the fishing travel pack 5, the closing means 30 is disengaged and the front section 11 is lifted upwards.

The top portion 11 of the fishing case 5 is provided with a plurality of pockets 41, storage compartments 42 and flexible holder bands 43. Fishing accessories and supplies may be placed in the pockets 41 and the storage compartments 42. The flexible holder band 43 may be used to securely hold small instruments, such as a pair of scissors or a pen knife.

Figure 6:
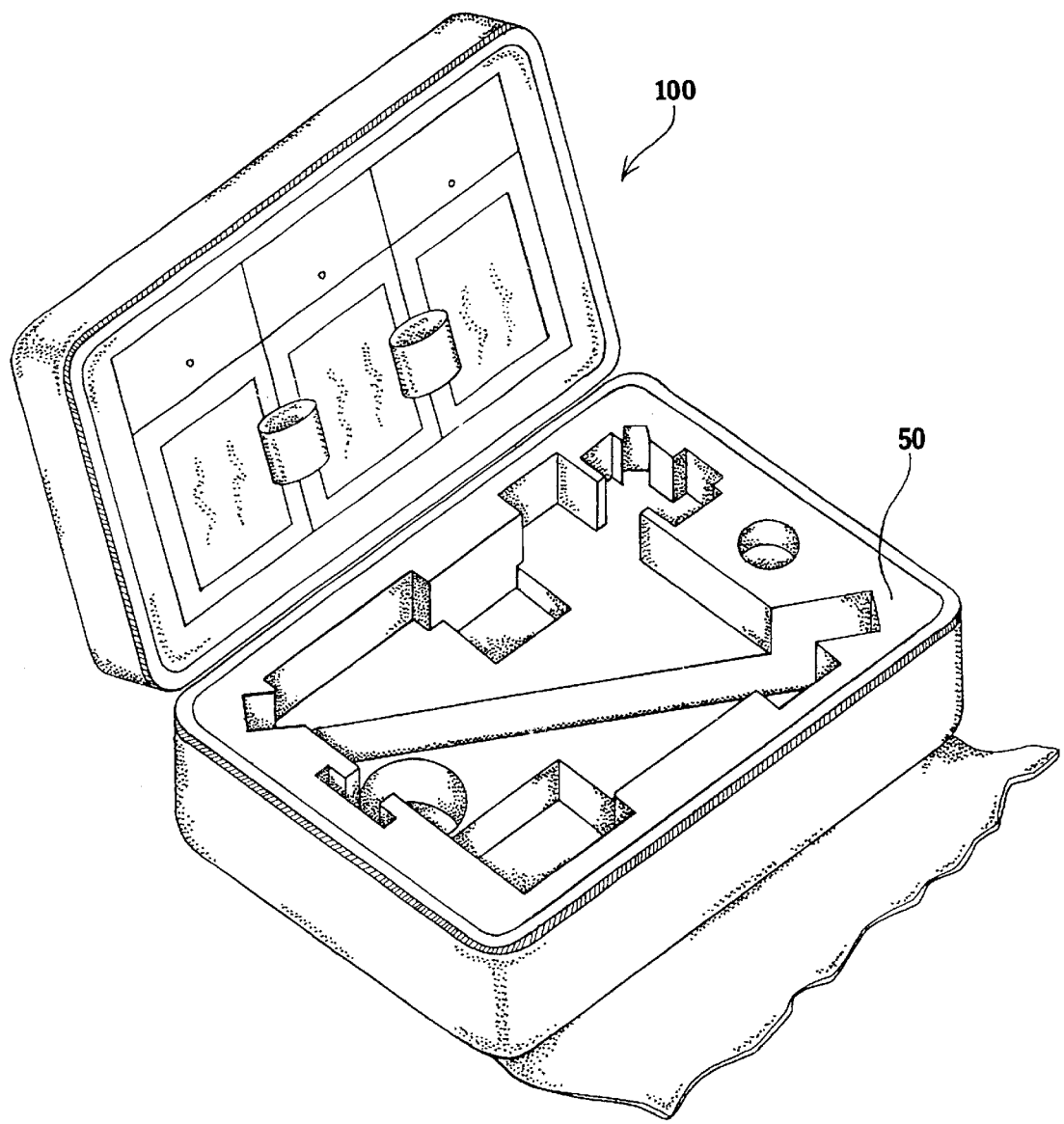
FIG. 6 shows the inside of the fishing case along with the first cutout insert.
Figure 7:
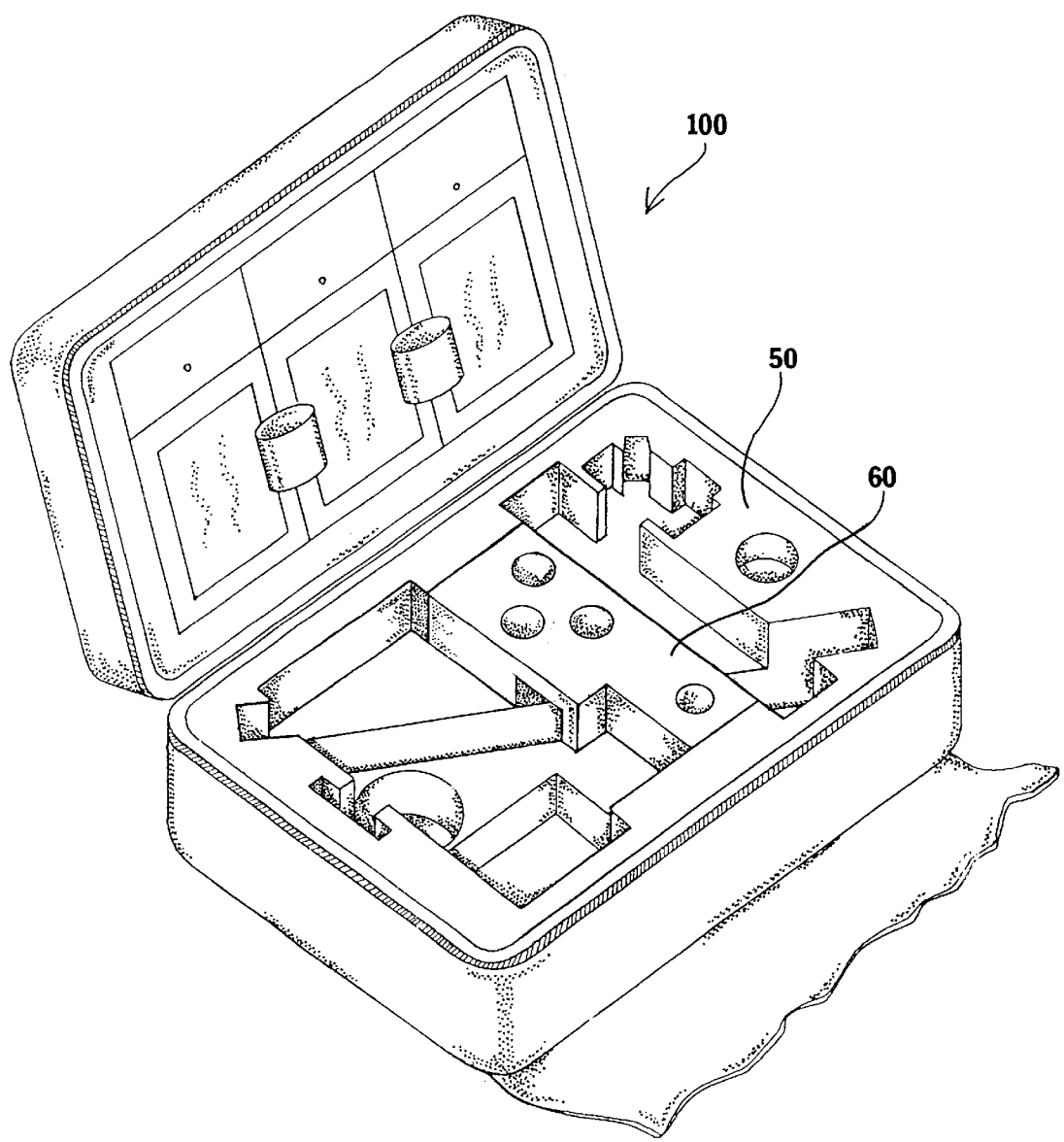
FIG. 7 shows another embodiment of the fishing case having two cutout inserts.

According to one embodiment of the present invention, shown in FIG. 6, the inside portion 32 of the fishing case 5 firmly houses a cutout insert 50. In another embodiment, shown in FIG. 7, the inside portion 32 of the fishing travel pack 5 removably houses a second cutout insert 60, which is fixedly placed on top of the first cutout insert 50.

FIG. 4 is a top view showing one embodiment of the cutout insert 50. According to this embodiment, the cutout insert 50 may be made from any flexible material, such as styrofoam.

The cutout insert 50 is provided with an elongated cutout 51, which is used for housing a folded fishing fly or rod. The elongated cutout 51 preferably extends diagonally across the case 5, to maximize the length of said elongated cutout 51 so as to allow a fishing rod of maximum dimension to be stored therein. The fly reel is stored in a circular cutout 52. Additional cutouts 53 are provided for storing flies.

FIG. 5 shows a second embodiment of a second cutout insert 60 that should be placed over the first cutout insert 50. The second cutout insert 60 forms a tray which may be inserted and removed from the case. When the second cutout insert 60 is placed in the tray, it generally covers the elongated cutout 51, and further prevents the fishing rod typically contained therein from moving. The scope of the present invention is not limited by the exact locations of the individual cutouts on the cutout insert 50 or the cutout insert 60.

Many specific details contained in the above description merely illustrate some preferred embodiments and should not be construed as a limitation on the scope of the invention. Many other variations are possible.

What is claimed is:

1. A fishing case for storing a variety of fishing equipment, the fishing case comprising:
    a substantially rectangular body, said body having a front section and a back section, said front section hingeably attached to said back section, said front section and said back section together defining an interior space;
    a closing means, said closing means securely fastening together said front section and said back section for selectively closing the rectangular body;
    a cutout insert having a plurality of cutouts to house the fishing equipment, the cutout insert including an elongated cutout extending diagonally across the rectangular body for holding a fishing rod and a circular cutout shaped for housing a fishing reel, said cutout insert securely fitted inside said back section of the fishing case; and
    a second cutout insert which removably covers the cutout insert so that said second cutout insert covers the elongated cutout when in place within the rectangular body.

2. The fishing case of claim 1, wherein said back section is connected to a closing flap, said closing flap having closing flap fastening means, said front section having reciprocal fastening means for engaging with said closing flap fastening means.

3. The fishing case of claim 2, wherein said fastening means is a clasp buckle.

4. The fishing case of claim 1, further comprising a handle on top of the fishing case.

5. The fishing case of claim 1, wherein said back portion comprises back flaps for carrying the fishing case as a backpack.

6. The fishing case of claim 1, wherein the inner portion of said front section has a plurality of pockets.

7. The fishing case of claim 1, wherein said closing means is a zipper.

8. The fishing case of claim 1, wherein said front portion has a plurality of pockets and storage compartments on its inside.

9. The fishing case of claim 1, wherein the exterior surface of the fishing case is waterproof.

10. The fishing case of claim 1, wherein said cutout insert is made from a flexible material.

11. The fishing case of claim 1, wherein said second cutout insert is made from a flexible material.

12. The fishing case of claim 1, wherein said second cutout insert is made from a resilient material.

* * * * *